July 30, 1968

A. KOGAN 3,395,085

PROCESS AND APPARATUS FOR SEA WATER CONVERSION USING SERIES
SHALLOW TRAY FLOW AND DIRECT CONTACT CONDENSATION

Original Filed Dec. 4, 1963

INVENTOR.
ABRAHAM KOGAN

BY

Brennan & Brennan
ATTORNEYS

INVENTOR.
ABRAHAM KOGAN

BY

*Bierman + Bierman*

ATTORNEYS

FLOW DIAGRAM FOR COMBINED SALINE WATER
DISTILLATION AND CONCENTRATION.

United States Patent Office 3,395,085
Patented July 30, 1968

3,395,085
PROCESS AND APPARATUS FOR SEA WATER CONVERSION USING SERIES SHALLOW TRAY FLOW AND DIRECT CONTACT CONDENSATION
Abraham Kogan, 35a Trumpeldor Ave.,
Nave Sha'anan, Haifa, Israel
Continuation of application Ser. No. 327,946, Dec. 4, 1963. This application Oct. 10, 1967, Ser. No. 674,351
Claims priority, application Israel, May 30, 1963, 19,320, 19,321
8 Claims. (Cl. 203—11)

ABSTRACT OF THE DISCLOSURE

Warm sea water is circulated through a series of horizontally oriented shallow trays, mounted in an evacuated chamber. Cooler fresh water, is circulated countercurrently with respect to the sea water through a second series of shallow trays, mounted adjacent the sea water trays. Vapor from the sea water condenses on the surface of the fresh water and thus warmed fresh water is passed in heat exchange with additional incoming sea water to cool the fresh water and heat the salt water.

---

This application is a continuation of application Ser. No. 327,946, filed Dec. 4, 1963 by the present inventor.

This invention relates to a process and apparatus which enable efficient transfer of heat and mass between two liquids of slightly different temperatures.

The difficulties involved in the art of conversion of sea water into potable water by processes utilizing changes of phase are connected with the high values of latent heat of vaporization and freezing. An amount of heat of about 1,000 B.t.u. is required in order to vaporize one pound of water. Considering even the cheapest conceivable means of heat production, as, e.g., in an atomic energy plant, it would still be absolutely prohibitive from the economic point of view to spend this heat unrecovered.

In an attempt to solve this problem, various multiple effect systems were devised, in which the heat released by a pound of condensing steam is reused for the vaporization of another pound of saline water at a somewhat lower temperature; this second pound of steam releases, upon condensation, the latent heat to a third pound of sea water, which vaporizes at a still lower temperature, and so on. The original 1,000 B.t.u. are thus thermodynamically degraded in small temperature steps, until they reach the lowest reservoir temperature available.

In alternative processes, instead of lowering the vaporization temperature in each effect, the temperature and pressure of the vapor is raised prior to condensation by addition of a small amount of heat. It is then left to condense and release its latent heat to a next amount of water which vaporizes. In such processes the saline water is vaporized at a constant temperature $T_1$ and vapor condenses at a higher constant temperature $T_2$. The amount of heat that must be spent for conversion of saline water is the sensible heat required to raise the temperature of vapor from $T_1$ back to $T_2$. Conversion processes by freezing are usually thermodynamically similar to this second category.

In both types of processes the heat economy is improved when the difference between the temperatures of condensing vapor and of vaporizing saline water is kept as low as possible. This difference can be decreased by the use of large heat exchanger surfaces. There is, however, a definite limit to the improvement that can be obtained in this way, determined by the high cost of heat exchanger equipment using heat transfer through metallic walls.

A considerable improvement in heat economy is obtained by the elimination of metallic heat transfer surfaces altogether. This is achieved by introducing a stream of preheated saline water and a stream of prechilled converted water into a common enclosure, without letting them mix. Part of the saline water is flashed into vapor, which condenses by direct contact with the free surface of the cooled converted water.

In order to obtain high heat transfer coefficients in the direct contact evaporation and condensation process, the following method is used in the present invention. A multiplicity of long shallow trays is placed inside a wide-diameter horizontal reservoir, in its axial direction. Streams of warm sea water are maintained in one direction in some of the trays, while streams of cold converted water flow in the remaining trays in the opposite direction. The space within the reservoir is evacuated to a sufficiently low pressure, in order to facilitate evaporation from the hot water surfaces and condensation at the cold water surfaces. The vapor emanating from the warm saline water is prevented from flowing in the axial direction by baffle plates placed at regular distances along the reservoir axis and oriented generally in planes normal to the axis. It condenses at the surface of adjacent trays carrying converted water. A true counter-current process is thus well approximated.

In order to prevent the development of temperature differences inside the water streams in the vertical direction, mixing of each flow along the trays is induced by various means, such as by roughening the tray wall surfaces, by submerging spoiler plates, resistance screens or vortex generating plates in the water streams. The high level of turbulence and/or strong vortices thus set up produce a continuous and thorough mixing of each stream, so as to homogenize the temperature in each of its cross-sections. The whole mass of water, and not only the surface layer, is thus induced to participate in the transfer process and good heat exchange effectiveness is obtained with trays of relatively short length.

While my present invention is applicable to various solution distillation and concentration processes, it is particularly valuable for conversion of saline water into potable water.

In the hotter regions of the world a considerable difference is found between the temperature of sea water at sea level and the temperature occurring in deeper layers. The temperature of sea water 200 meters below sea level off shore California, e.g., is nearly constant during the whole year, 8° C. to 9° C., while there is a periodic seasonal temperature variation at sea level, attaining a minimum of about 14° C. in February and a maximum of 19° C. approximately, in August. A temperature difference of about 8° C. is thus available on the average between sea level and the 200 meter deep layer. In tropical regions even much higher temperature differences are found between the surface layer and deep sea layers, and it is just in these regions where a cheap water conversion process would be most valuable.

If warm water drawn from the sea surface layer at temperature T, is introduced into a chamber evacuated to a pressure below the sea water boiling pressure $p_1$, corresponding to temperature $T_1$, then part of the water is vaporized. The heat necessary for vaporization is extracted from the mass of remaining brine. The temperature of the brine drops accordingly and the process would continue until equilibrium temperature and pressure were reached.

If care is taken to remove continually the vapor from the vessel and to replace continually the cooled brine by fresh warm sea water, the process could proceed indefinitely.

A continuous stream of water from the sea surface level through a pipe to an evacuated chamber and then through a second pipe back to the sea can be maintained easily by utilizing the barometric column principle. As long as the bottom of the evacuated chamber is placed at a height above the surface of aspired water not exceeding the barometric column height, water can be circulated through the system by some low power pumping means, mechanical energy being required to overcome friction losses only.

By the same reasoning it is realized that pumping of cold water from a deep sea layer to almost sea level can be achieved without expenditure of much work, the only mechanical energy required being spent again on friction losses.

It is thus not difficult to establish two streams through evacuated chambers, one of warm sea water, drawn from the sea surface level, and one of cold sea water, drawn from a deeper layer. If the two chambers were brought in communication by a wide pipe, connecting their upper parts, vapor produced in the hot water chamber will stream continually into the cold water chamber, where it will condense by direct contact with the cold water.

In this form the process would not be of any value for water desalination, since the condensing vapor is lost with the cold water. In order to recover the vapor in the form of converted water the stream of cold sea water can be replaced by a stream of cold converted water, which is continually recirculated.

Part of this stream, corresponding to the amount of condensed vapor, is bled off as product and the heat of condensation added to the stream is removed from it before it is returned to the vacuum chamber by heat exchange with a secondary stream of cold sea water.

For the purpose of illustration I show in the accompanying drawings a schematic representation of one embodiment of my invention relating to saline water conversion, from which the method will be well understood.

Referring in detail to FIGS. 1–5, the reservoirs 10, 11, 12, 13 which represent successive stages of the system, are oriented with their axes in a horizontal direction. In each reservoir a plurality of long shallow trays 14 and 15 are arranged horizontally in a number of rows. The trays 14 and the trays 15 are placed intermittently in each row, so that no two trays 14, or two trays 15, are adjacent.

Figure 1:
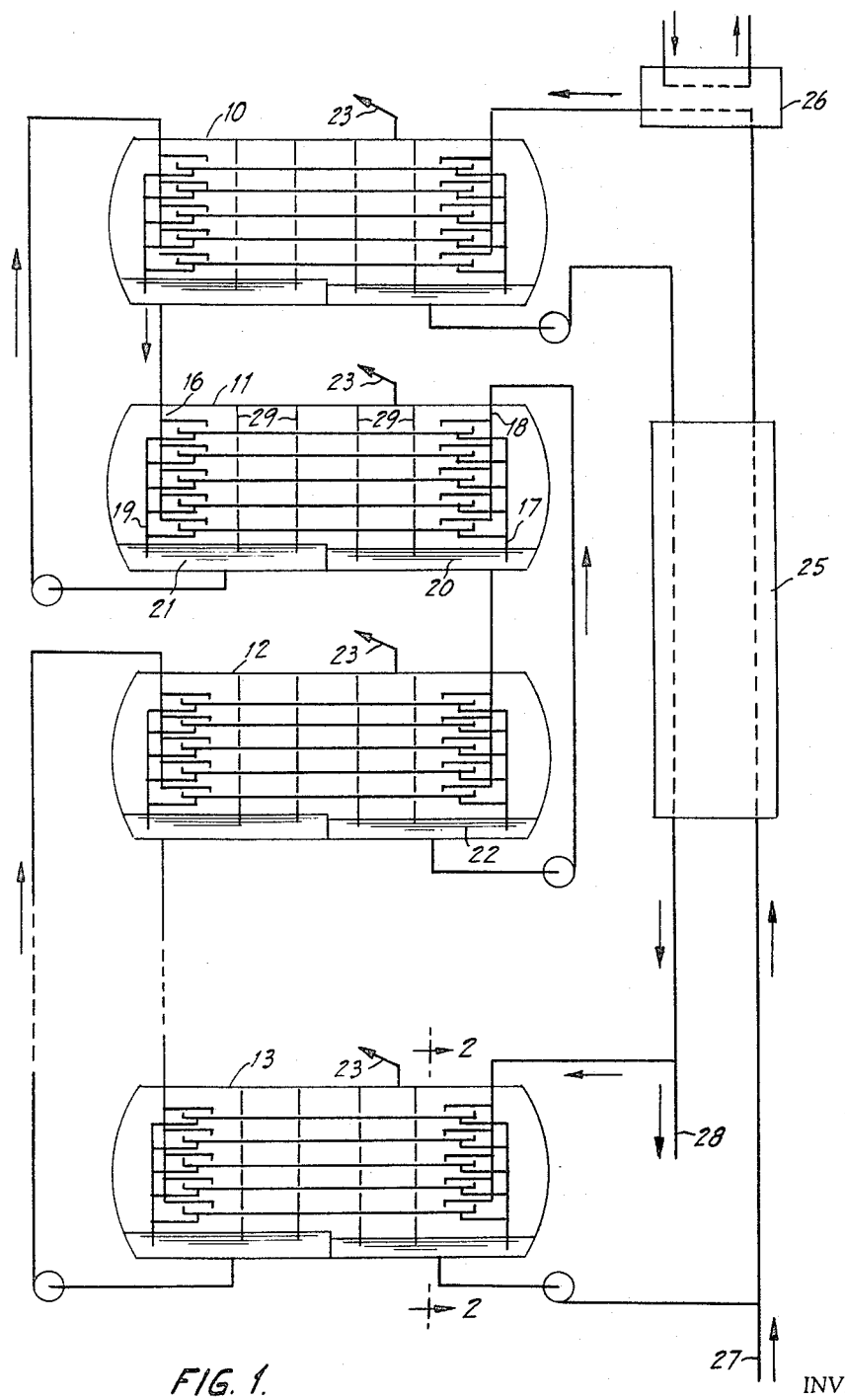
FIGURE 1 is a diagrammatic sectional view of the apparatus.
Figure 2:
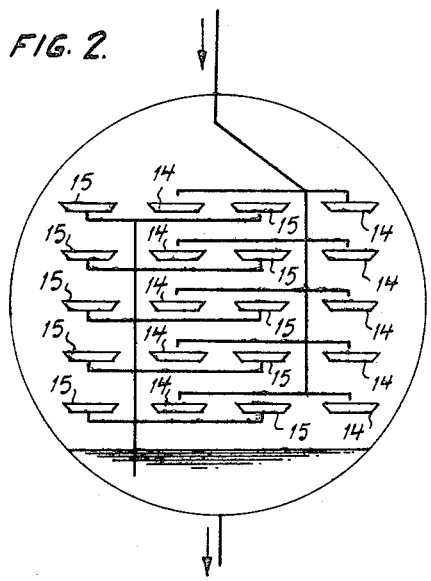
FIGURE 2 is an enlarged diagrammatic cross-sectional view on line 2—2 in FIG. 1.
Figure 4:
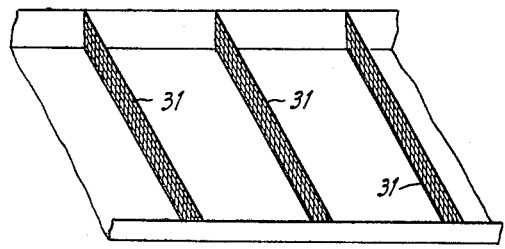
FIGURE 4 is a perspective view of a fragment of a tray equipped with resistance screens.
Figure 3:
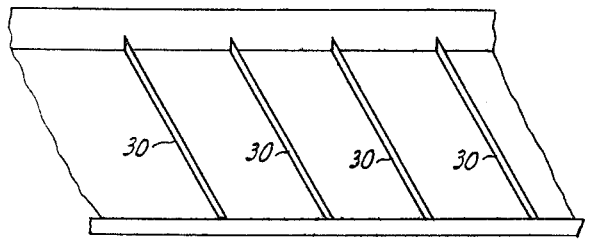
FIGURE 3 is a perspective view of a fragment of a tray equipped with spoiler plates.
Figure 5:
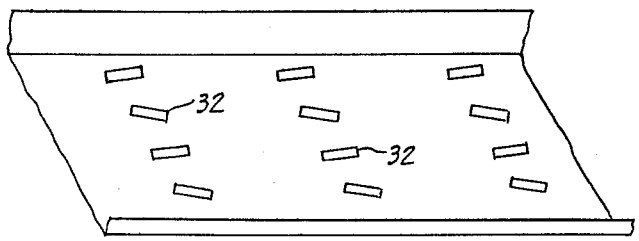
FIGURE 5 is a perspective view of a fragment of a tray equipped with vortex generating plates.

This alternating arrangement of the trays cannot be clearly shown in FIG. 1 since the trays in each row are on the same level, but the disposition of the trays in the alternate arrangement above mentioned is clearly shown in FIG. 2.

The reservoirs are evacuated through pipes 23 by some pumping means to appropriately low pressures, corresponding to the lowest temperature in each stage.

Heated brine emerging from the heat exchanger 25 flows into the heater 26, where more heat is added to it by hot steam injection or some other means.

The hot brine is introduced into the highest stage 10 and is passed down through the successive stages.

A stream of converted water flows in each stage and flows through piping 52 in a counter current direction relative to the stream of brine, and upon leaving each stage, it is pumped into the next upper stage.

Considering in detail the flow process in reservoir 11, brine flowing out from the next upper stage, reservoir 10, is introduced through the piping system 16 and distributed to the left side ends of trays 14. It flows in each tray 14 in a shallow layer from left to right and is collected from the right side ends of trays 14 through piping system 17 to sump 20.

Converted water at a somewhat lower temperature is pumped from the converted water sump 22 of the next lower reservoir 12, and introduced through piping system 18 to the right side ends of trays 15. It flows in shallow layers along trays 15, from right to left and is collected from the left side ends of trays 15 through piping system 19 to the converted water sump 21.

Since the brine flowing in trays 14 is at a somewhat higher temperature than the converted water flowing counter currently in trays 15, some amount of vapor flashes from the brine and condenses at the free surface of the converted water stream. The converted water leaves therefore trays 15 at a somewhat increased rate and at a higher temperature than its temperature of inflow. A corresponding decrease in brine flow rate and temperature occurs in the flow direction in trays 14.

As a net result a stream of concentrated and cooled brine emerges from the lowest stage, while the stream of converted water leaves the top stage at a high temperature and at an increased rate of flow.

A stream of feed saline water 27 is added to the cold brine stream, which is then directed to the heat exchanger 25, preferably of the liquid-liquid-liquid direct contact type. Here it exchanges heat with the stream of converted water.

The stream of brine emerging from the heat exchanger 25 enters heater 26 and starts a new cycle.

Part of the cooled converted water leaving the heat exchanger 25 is diverted through pipe 28 to storage tanks as product, while the main stream of converted water starts a new cycle by entering the lowest stage.

The pressure in each stage is regulated and maintained at a level corresponding to the lowest temperature occurring in that stage.

Since there is a temperature difference not only between converted water and brine passing in adjacent trays through a plane normal to the reservoir axis, but also between different points along the reservoir axis, baffle plates 29 are introduced at regular distances along the axis, oriented in planes normal to the axis. These plates hinder flow of vapor in the axial direction. A weak artificial pressure gradient is thus established along the reservoir while vapor flows from trays 14 to trays 15, mainly in a transverse direction.

The vapor condensing at the free surface of the stream of converted water forms a film of warm water. This film tends to impede the further condensation of vapor.

Similarly the upper layer of brine is chilled by the vaporization taking place at its surface, and this tends to prevent further vaporization.

The rates of condensation and vaporization at the free stream surfaces depend therefore to a great extent upon the intensity of turbulence and mixing taking place in each stream. In order to increase the degree of turbulence the tray walls are roughened.

In an alternative version the flow in each tray is mixed artificially by passing it over spoiler plates 30 disposed in a direction generally normal to the flow direction. Highly turbulent wakes are formed behind the spoiler plates and this helps to homogenize the temperature in each flow cross-section.

A similar effect is obtained alternatively, by introducing wire screens 31 at certain intervals along the flow, oriented normal to the flow direction.

In still another version, short vertical plates 32 are attached to the bottom of the trays 14, 15. These plates may be either flat, or they may have a profile simulating simple airfoil shapes. They are of short span and are completely submerged in the water stream. They are oriented alternatively at positive and negative angles of attack to the main flow direction.

When water flows past these plates, longitudinal vortices are generated by them. These persist for some length along the flow and help to maintain a thorough mixing.

Figure 6:
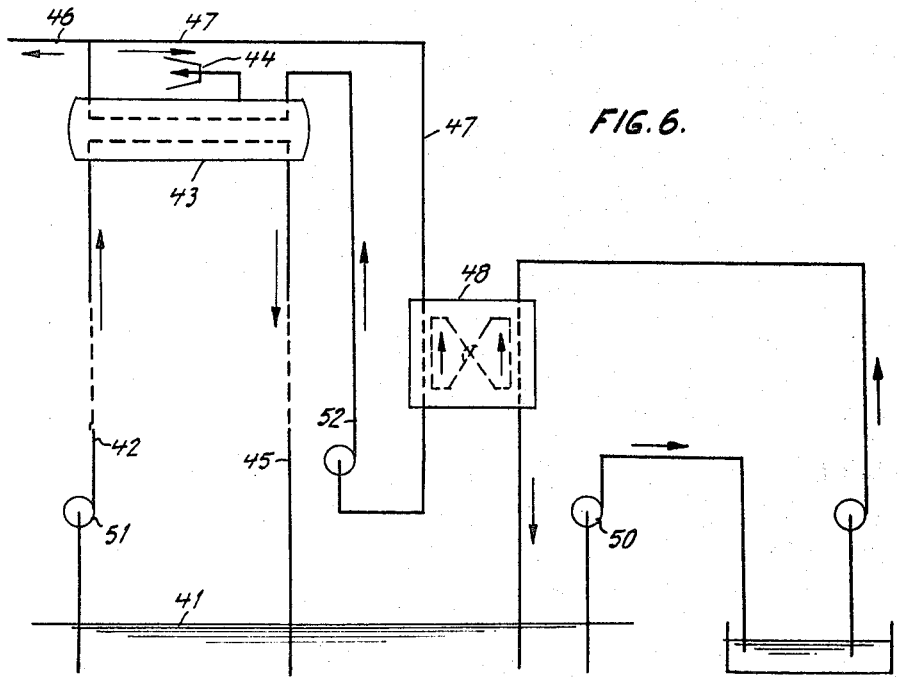
FIGURE 6 is a diagrammatic view of a modified apparatus particularly useful in connection with sea water treatment.
Figure 7:
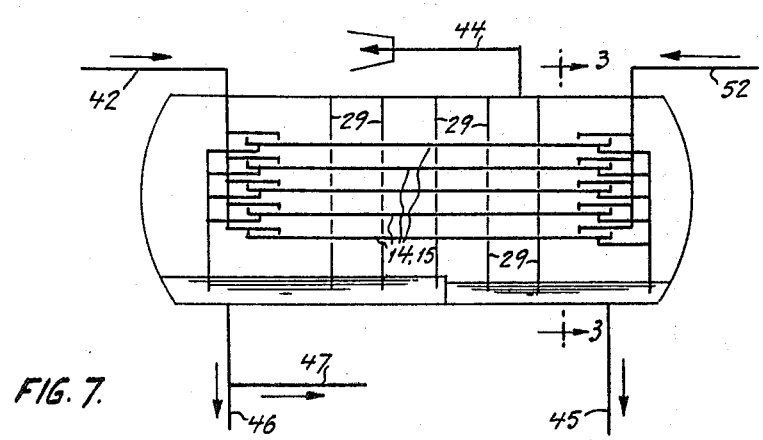
FIGURE 7 is an enlarged diagrammatic view of the evacuated mass transfer chamber of FIG. 6.

Referring in detail to FIGS. 6 and 7, warm sea water is pumped from sea level 41 through pipe 42 to reservoir 43, which is kept at a low pressure by some evacuating means 44. Upon entering reservoir 43 the water flows essentially in a horizontal direction in a plurality of shallow trays 14, which are arranged in the axial direction of the reservoir. After reaching the end of trays 14 it is returned to the sea through pipe 45.

The reservoir 43 is preferably situated at an appropriate height above sea level, so that the increase in potential energy of each pound of sea water pumped into the reservoir is balanced by the potential energy decrease of one pound of water returning from the reservoir to the sea. The energy required by the pump 51 corresponds then mainly to the flow friction losses.

A stream of converted cooled water enters reservoir 43 and flows in a plurality of trays 15, also oriented in the axial direction and arranged intermittently with trays 14, so that no two trays 14 nor any two trays 15, are adjacent. The converted water flows in trays 15 in a direction counter current with respect to the flow direction in trays 14.

Due to the difference in temperature between the two streams in each normal cross-section of the reservoir, part of the saline water stream is vaporized from trays 14, and the vapor is condensed by direct contact at the free surface of the converted water in trays 15.

This transport of mass between the two streams is accompanied by a transport of heat, representing the heat of vaporization and condensation of the distilled water. The concentrated brine returns therefore to the sea at a somewhat reduced temperature, while the temperature of the stream of converted water is increased towards its exit from reservoir 43.

Part of this stream, representing the converted water product, is diverted through pipe 46 to storage tanks. The remaining main stream of converted water is led through pipe 47 to heat exchanger 48, where it is cooled by a stream of cold sea water originating from a deep sea layer.

The cooled converted water is returned through pipe 52 to reservoir 43, where it starts a new cycle.

In the embodiment of my invention represented in the drawings, the heat exchanger is of the liquid-liquid-liquid-type. An intermediary liquid which is immiscible with water, is sprayed into a stream of cold sea water and cooled by it by direct contact in a counter current flow. After separation from the sea water by gravity, the intermediary liquid is sprayed into the stream of converted warm water. Heat is exchanged by direct contact between the liquid and the converted water which move countercurrently. Upon separation by gravity, the converted water emerges cool and is directed to trays 15 in reservoir 43, while the warmed oil starts a second cycle in the heat exchanger.

In reservoir 43 there is a temperature variation not only between converted water and brine passing in adjacent trays through a plane normal to the reservoir axis, but also between different points along the reservoir axis. In order to prevent flow of vapor in the axial direction, baffle plates 29 are introduced at regular distances along the axis, oriented in planes normal to the axis. A weak artificial pressure gradient is thus established along the reservoir, while vapor flows from trays 14 to trays 15 mainly in a transverse direction.

Figure 8:
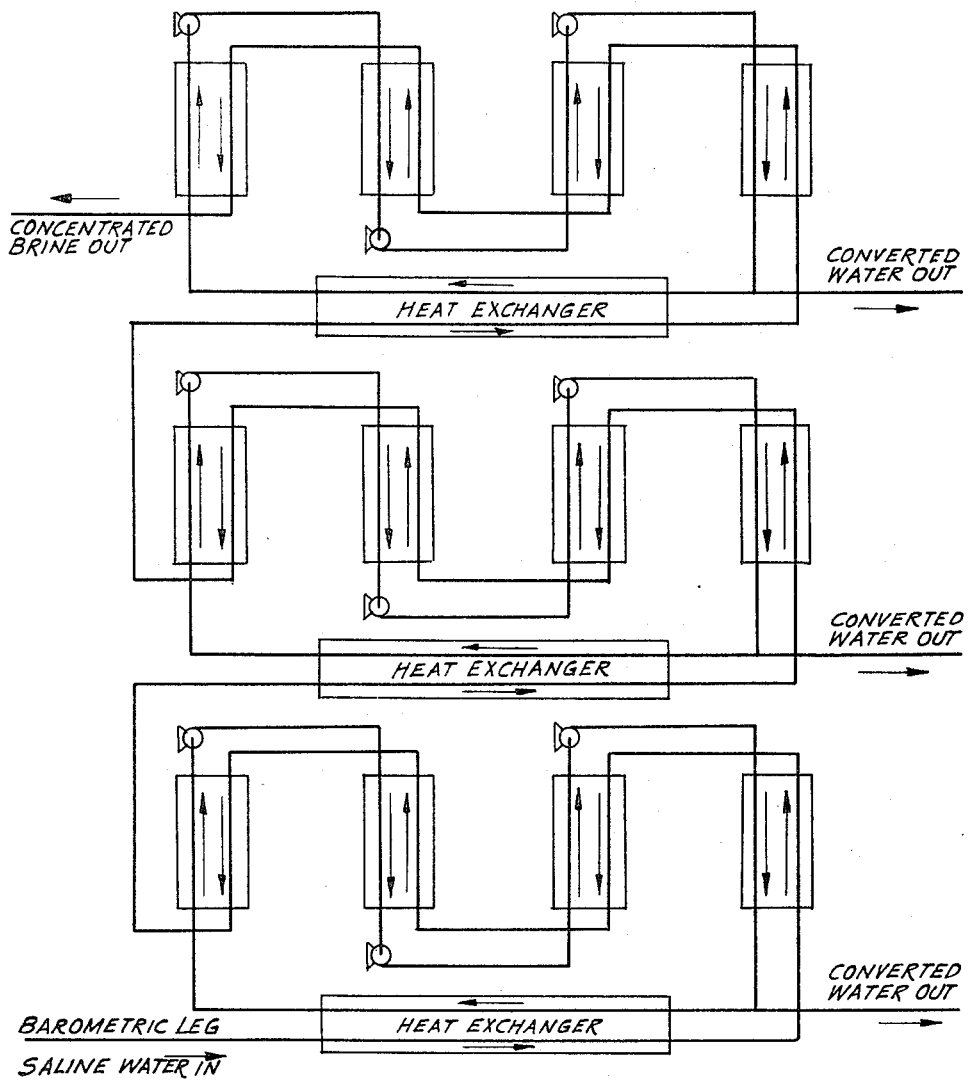

FIG. 8 represents a flow diagram of a combined saline water concentration and distillation process.

The concentration plant as shown in FIG. 8 is built up of three units, each one consisting of four stages of counter current heat and mass exchangers (direct contact exchangers of the type I claim) and a heat exchanger.

Converted water is recirculated in each unit, after having exchanged heat with the entering cool brine from a previous unit or from the sea. The water converted during each cycle is withdrawn from the recirculating converted water flow and represents the converted water product.

The brine emerges from the fourth stage of each unit with an increased salt concentration, as compared with its concentration at the intake to the first stage. It is fed into the next unit for further concentration or to storage tanks as product.

Of course the plant can be built of many number of units. Also the number of stages in each unit can be optimized to meet specific temperature and concentration data.

To the liquid-liquid-liquid heat exchanger, cold brine is introduced at the upper end of the left tank, while hot heat transfer fluid (an oil that does not mix with water) is fed to the lower end of the tank in dispersed form. The oil being lighter than water, the oil droplets rise in the water medium and thereby heat is exchanged between them. The cooled oil is then collected at the upper part of the left tank and is directed from there to the bottom of the right tank. There it rises again as an emulsion, but this time it picks up heat from the downflowing converted water.

The hot brine emerging from the left tank and the cool converted water from the right tank are introduced to corresponding points in the first and last stages of heat and mass transfer.

What is claimed is:

1. An apparatus for conversion of brine into fresh water comprising a plurality of superposed rows of shallow trays, the trays in each row being arranged in side-by-side, adjacent relation, said trays being on substantially the same horizontal plane, a chamber containing the rows of trays, means for evacuating said chamber to low pressure, means for heating brine water, means for delivering the brine water after being heated into one end of each of the alternate trays in each of the rows, a sump in which the brine water flowing from the trays is collected, means for delivering a flow of converted water at a lower temperature than the temperature of the brine water into ends of trays located opposite to the ends of the trays into which the brine water is deposited, the trays in which the converted water is deposited alternating in each row with those into which the brine water is deposited, and baffle means extending transversely in each tray.

2. An apparatus according to claim 1, wherein the baffle means consists of roughened walls in the form of wire screens disposed within the trays and extending transversely across the same, said screens being submerged in the liquid streams and generate turbulence and mixture of said streams whereby the formation of temperature differences in a vertical direction in said liquid streams is counteracted.

3. The apparatus according to claim 1, wherein the baffle means are short plates for the generation of vertex in the streams and are located at regular intervals in the trays and hence in the liquid streams, which plates are disposed at slight angles to the main stream direction, thereby inducing longitudinal vertices trailing downstream from the extremities of said plates to produce thorough mixing in said streams and the homogenization of temperature in vertical planes.

4. An apparatus for the conversion of brine into potable water comprising means for circulating a first stream of warm saline water through an evacuated enclosure, said enclosure containing a plurality of horizontal shallow trays through which said saline water is passed, means for circulating a second stream of converted water counter-current to said first stream through said enclosure, a number of horizontal shallow trays, into which said second stream is received, arranged on substantially the same horizontal plane as said plurality of trays, said plurality of trays being adjacent said number of trays, whereby vaporization from said first stream and condensation by direct contact with the surface of said second stream is enhanced, a heat exchanger on the downstream side of said enclosure with reference to said second stream through which said second stream is passed where it gives up the heat gained by condensation, means for removing part of said second stream as a converted water product, and means for circulating the remainder to said number of trays.

5. An apparatus according to claim 4 wherein said trays receiving said first stream and said trays receiving said second stream are arranged in vertical levels.

6. An apparatus according to claim 4 wherein there is provided means for circulating a third stream of cold sea water drawn from a deep sea layer through said heat exchanger and discharged back to the sea, whereby said sea water receives the heat given off by said converted water.

7. An apparatus according to claim 4 wherein there is provided means for circulating said first stream through said heat exchanger whereby said first stream is warmed by the heat of condensation of said second stream.

8. The method of converting sea water into potable water comprising circulating a stream of warm saline water drawn from a surface layer of the sea through a chamber evacuated to low pressure, flowing said water in one direction through a plurality of horizontal, superposed trays arranged in rows and causing the flow of such water, after passing through the trays to be returned to the sea, circulating a stream of converted water of lower temperature than the sea water through trays located in the rows between the trays through which the sea water flows, and in a direction opposite to the flow of the sea water, vapor from said sea water contacting said converted water whereby condensation of said vapor takes place, subjecting the converted water to the effects of a heat exchanger to cause it to give up heat gained by the condensation, removing part of the converted water, circulating the remainder of the converted water to another group of the trays and circulating a stream of cold sea water, drawn from a deep sea layer through the heat exchanger to enable it to receive the heat given up by the converted water that passed through the heat exchanger, and returning the last-mentioned sea water to the sea.

References Cited
UNITED STATES PATENTS

| | | | |
|---|---|---|---|
| 2,749,094 | 6/1956 | Lewis | 165—107 |
| 2,803,589 | 8/1957 | Thomas | 203—11 |
| 3,212,999 | 10/1965 | Sommers | 203—100 |
| 3,207,677 | 9/1965 | Colton et al. | 203—11 |
| 3,219,552 | 11/1965 | Starmer et al. | 202—173 |
| 3,220,203 | 11/1965 | Rose | 62—58 |

WILBUR L. BASCOMB, JR., *Primary Examiner.*